July 5, 1966  J. D. BALL ETAL  3,259,879
APPARATUS FOR SEISMIC EXPLORATION
Filed Nov. 26, 1963

INVENTORS.
JOHN D. BALL,
HARRY R. ESPEY,
BY
ATTORNEY.

United States Patent Office 3,259,879
Patented July 5, 1966

3,259,879
APPARATUS FOR SEISMIC EXPLORATION
John D. Ball and Harry R. Espey, Houston, Tex., assignors, by mesne assignments, to Esso Production Research Company, Houston, Tex., a corporation of Delaware
Filed Nov. 26, 1963, Ser. No. 326,037
2 Claims. (Cl. 340—15.5)

This invention relates to geophysical prospecting utilizing the seismic technique, and more particularly to a technique for eliminating or reducing the effects of variable seismic impulse parameters and variable seismic wave detecting parameters on the traces of a seismogram.

The general method of geophysical exploration utilizing seismic waves comprises the steps of initiating a seismic impulse at or near the surface of the earth, and recording signals generated by geophones as a result of the earth's movements at one or more points more or less spaced from the point of origin of the impulse. The recordation must permit measurement of the time elapsing between the instant of the origination of the impulse and the generation of signals as the result of the subsequent earth movement. The original impulse will set up seismic waves that are transmitted through the earth. Any discontinuity or variation of structure within the earth will reflect and/or refract a portion of the energy in the waves so that a recording of the signals from the receiving points will comprise a number of arriving waves, each derived from the original impulse and each depending from the others in time of arrival, magnitude, and wave shape, or all three.

As the result of variations in seismic wave impulse parameters and variations in recording parameters (these may be lumped or near surface effects), the data traces resulting from generation and detection of seismic waves as set forth above will vary both in amplitude and phase, with changes from one impulse point to another, and with changes from one detecting location to another. Adjacent traces may vary considerably even though the same information concerning the geologic column traversed by seismic waves is contained therein.

The variable seismic impulse parameters referred to above are concerned with the size of the dynamite charge used to produce the seismic impulse and the effectiveness of the coupling between the energy source and the earth. The variable detecting parameters have to do with variations in geophone construction, effectiveness of the coupling between the earth and the geophone, and the like.

In the past it has been customary to apply automatic gain control in the recordation of data traces produced from electrical signals resulting from detection of seismic waves. While the use of automatic gain control on playback of reproducible seismograms will eliminate undesired amplitude variations in the data traces, it will result in the loss from the data traces of amplitude information related to the geologic column.

In accordance with the teaching of the present invention, there is provided a reproducing means for reproducing the data traces of a reproducible seismogram as electrical signals and recording means for recording such electrical signals. Interconnecting the reproducing means and recording means are a plurality of signal channels each including a variable gain amplifier. Further provided is apparatus for controlling the gain of the variable gain amplifier, including an absolute value amplifier for amplifying the signal appearing in the signal channel, an electrical integrator for integrating the output signal of the absolute amplifier, a constant frequency signal generator, and a linear modulator for producing an output signal having the frequency of the signal generator and having an amplitude proportional to the output signal of the electrical integrator. Switching means is provided for connecting an output signal from the reproducing means to the variable gain amplifier only after first arrival signals have been reproduced by the reproducing means during first alternate reproducing cycles thereof. (By reproducing cycle is meant one reproduction of a previously recorded seismic signal.) The switching means is further adapted to connect the absolute value amplifier to the signal channel only during first alternate cycles of the reproducing means. Thus, the amplitude of the signal produced by the variable gain amplifier during a second alternate reproducing cycle of the reproducing means is determined by the amplitude reached by the output signal of the linear modulator at the end of the immediately preceding first alternate reproducing cycle of the reproducing means.

Objects and features of the invention not apparent from the above discussion will become evident upon consideration of the following detailed description of the invention taken in connection with the accompanying drawing, wherein.

Figure 1:
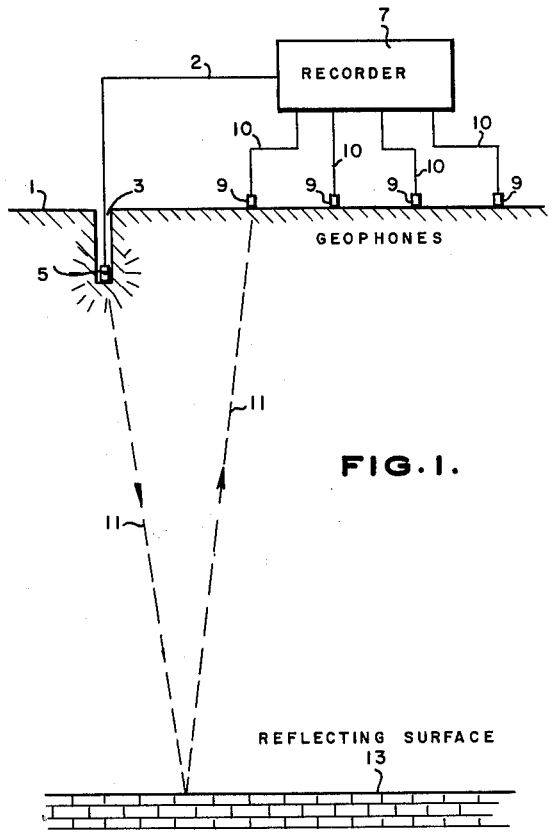
FIG. 1 is a schematic representation in very elementary form of apparatus for performing a seismic observation in accordance with the invention.

With reference now to FIG. 1, there is shown apparatus suitable for performing a seismic observation. A seismic source 5, such as dynamite, is placed in a shothole 3 and a plurality of geophones 9 are spaced apart therefrom on the earth's surface 1 at various distances along a seismic traverse. A recording apparatus 7, which may be a linear magnetic tape recorder of conventional design, is provided which is connected to the explosive charge 5 in the shothole 3 through an electrical lead 2, and to the various geophones 9 through electrical leads 10. A source of electricity is connected to the recorder 7 in the usual fashion by means of which the seismic charge 5 is detonated upon closure of a triggering device in the recorder. The geophones 9 may be laid directly on the earth's surface or they may be placed in small holes drilled in the earth's surface and coupled to the earth by a liquid medium. While a conventional explosive charge apparatus for producing seismic waves is illustrated, it is manifest that there may be utilized other types of seismic sources such as a weight dropping apparatus and technique such as is described in U.S. Patent No. 2,851,121—McCollum.

When the explosive charge 5 is detonated by the triggering device in recorder 7, an artificial seismic disturbance is produced that is substantially spherical and progresses outwardly in all directions from the explosive charge 5. When the seismic wave produced by detonation of the explosive charge 5 reaches a subterranean earth interface such as that designated by the reference numeral 13, a portion of the energy in the wave will pass downwardly through the interface into the earth, but a portion of such energy will be reflected upward toward the earth's surface 1. A ray path that may be followed by a reflected seismic wave from explosive charge 5 to one of the geophones 9 is designated by reference numeral 11. The seismic energy in traversing the geologic column to others of the geophones 9 will be reflected from other locations on the interface 13 in the usual manner. The electrical signals produced by geophones 9 responsive to seismic waves detected thereby will be recorded as data traces on the recording medium of the recorder 7.

Figure 2:
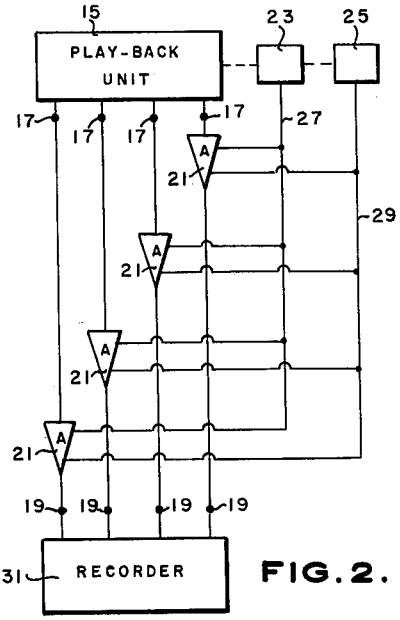
FIG. 2 is a schematic diagram of re-recording apparatus for use in the practice of the invention.

With reference now to FIG. 2, there is shown a linear reproducing apparatus 15 for reproducing electrical signals from the traces of the seismogram produced by recorder 7, which apparatus may be a magnetic tape recording apparatus of conventional design. The output signals from the reproducing apparatus 15 appearing at output terminal 17 thereof are coupled to the input terminals 19 of a re-recording apparatus 31 through signal channels including amplifier apparatus 21. While only four signal channels are illustrated in FIG. 2, it is to be understood that there will be a signal channel for each of the traces to be reproduced thereby. In FIG. 1, four traces are assumed to have been recorded by recorder 7 responsive to electrical signals produced by geophones 9, although it is further to be understood that a much larger number of geophones will be used in actual practice. The signal channels from reproducing apparatus 15 therefore will correspond in number to the geophones used in the seismic observation.

Relay control apparatuses 23 and 25 are connected to the reproducing apparatus 15 for the purpose of controlling relays in the various amplifying apparatuses 21. Such relay control apparatuses 23 and 25 may be in the form of cam-actuated switches. The apparatus 23 is adapted to produce a control signal on line 27 after reproduction by reproducing apparatus 15 of events on the seismograms corresponding to first arrival signals, which first arrival signals are produced by energy transmitted either directly through the weathered layer of the earth or by reflection or refraction from the interface between the weathered layer and the stratum therebeneath. The electrical signal continues until the end of two reproduction cycles of the reproducing apparatus 15. The relay control means 25 produces a control signal on line 29 during alternate reproduction cycles of the reproducing apparatus 15.

Figure 3:
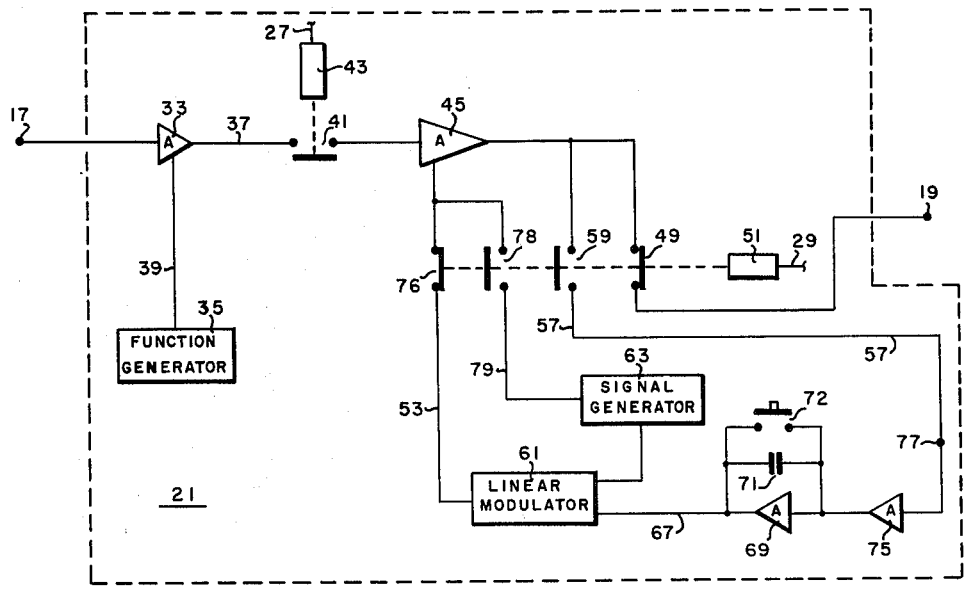
FIG. 3 is a schematic diagram of the amplifier 21 shown in FIG. 2.

With reference now to FIG. 3, there is shown in schematic form one of the amplifying apparatuses 21 illustrated in FIG. 2. In the signal channel between terminals 17 and 19 there is connected in sequence a variable gain amplifier 33, contacts 41 of relay 43, variable gain amplifier 45, and contacts 49 of relay 51. The gain of amplifier 33 is controlled by a function generator 35 which is connected to amplifier 33 by line 39. On occasions, the original recording of a seismogram is performed with apparatus including a variable gain amplifier, the gain of which is varied to compensate for the decay in amplitude of energy detected by geophones after the production of a seismic impulse. The function generator 35 produces an output signal which is an inverse function of the desired gain function used to control the seismic signal during the complete reproduction cycle. Thus, the output signal produced by amplifier 33 will be a corrected time variant gain function appropriate to the area of recording interest.

Amplifier 45 is adapted to produce an output signal that is an inverse function of the control signal applied thereto on line 53. A suitable amplifier for this purpose is illustrated in U.S. Patent No. 2,932,357—White.

The amplitude of the signal appearing on line 53 that varies the gain of amplifier 45 is derived from a control loop including absolute value amplifier 75, an integrating circuit comprising amplifier 69 and integrating capacitor 71, and a linear modulator 61 for producing an output signal having the frequency of the signal from signal generator 63 and an amplitude linearly proportional to the output signal of the electrical integrator. The input terminal 77 of the absolute value amplifier 75 is coupled to the output of amplifier 45 by means of normally-open contacts 59 of relay 51. The absolute value amplifier 75 may be of the type illustrated in the text, A Palimpsest on the Electronic Analog Art, edited by H. M. Paynter, printed by G. A. Philbrick (1955), pp. 4–9 and 27–47. The amplifier produces a unipolarity output signal similar to that of a full-wave bridge rectifier except that the output signal has an amplitude which is a linear function of the amplitude of the signal applied thereto, and not a nonlinear function as is produced by the ordinary bridge rectifier.

A single signal generator 63 may be used in conjunction with all of the amplifying apparatuses 21 illustrated in FIG. 2 or, if convenient, a separate signal generator may be provided for each of the amplifiers 21. In the interest of economy the first alternative probably will be found to be the most desirable.

The operation of the apparatuses illustrated in FIGS. 2 and 3 is as follows. On the first half of a reproduction cycle of magnetic tape playback apparatus 15, relay contacts 41 will remain open until reproduction of the first arrival events on the seismogram, and thereafter will remain closed during the remainder of the reproduction cycle. However, contact 59 will immediately close and contact 49 will open so that the output signal of amplifier 45 will not be recorded by the recording apparatus 31. Contacts 76 will immediately open and contacts 78 will close so that a constant amplitude control signal will be applied to amplifier 45 during the first half of a reproduction cycle. This signal will be integrated by the integrating amplifier so that the signal appearing on line 67 will gradually increase in magnitude. The output signal from linear modulator 61 also will increase in magnitude until the end of the first reproduction cycle of reproducing apparatus 15. During the second reproduction cycle of apparatus 15, the output signal from linear modulator 61 will remain of constant amplitude so that the gain of amplifier 45 will remain constant.

At the end of the first reproduction cycle, relay 51 will be actuated to close contact 49 and open contact 59. The contacts 76 will close and contacts 78 will open so that amplifier 45 will be switched from control line 79 to control line 53. The output signal from reproducing apparatus 15 will be amplified at a level determined by the magnitude of the signal appearing on line 53 and by the function produced by function generator 35. This signal will appear on terminal 19 and will be recorded by recorder 31. It will be found that the variables introduced into the signal by the shot point parameters affecting amplitude, and the detection parameters, will be virtually eliminated from the signal recorded by recorder 31.

It is to be understood that recorder 31 may be either a magnetic tape recorder or a recorder adapted to produce data traces in visual form. It is further to be noted that contact 49 may be normally-open and contact 59 will be normally-closed, depending upon the type of electrical signal produced on line 29 by the relay controlling device 25.

At the end of the second alternate cycle, the capacitor 71 of the integrating amplifier should be discharged. This may be done by depressing manually-actuated contact 72. If desired, however, discharge of capacitor 71 may be effected by closing the contact of a relay actuated by a suitable cam attached to reproducing apparatus 15.

If there is available only one amplifier 45 and associated control equipment therefor, each trace of the seismogram may be successively reproduced two times, as described above, the traces being reproduced in sequence and applied to the one amplifier. The signals from the amplifier may be recorded as traces side by side in the order of reproduction to form the traces of the corrected seismogram.

Having described the principle of the invention and the best mode in which we have contemplated applying that principle, we wish it to be understood that the apparatus described is illustrative only and that other apparatus can be employed without departing from the true scope of the invention as set forth in the accompanying claims.

We claim:

1. Apparatus for removing from a data trace of a reproducible seismogram the effects of variable seismic impulse parameters and variable detecting parameters, comprising:

reproducing means having output terminal means, for reproducing said data trace as an electrical output signal of said output terminal means;

recording means having input terminal means for recording electrical signals applied to said input terminal means in data trace form;

signal channel means individually connecting said output terminal means to said input terminal means including variable gain amplifier means connected between said input terminal means and said output terminal means;

an absolute value amplifier having an input terminal, for linearly amplifying an electrical signal applied thereto;

an electrical integrator connected to said absolute value amplifier for integrating the output signal of said absolute amplifier;

a constant frequency signal generator;

a linear modulator having an output circuit, connected to said signal generator and to said electrical integrator to produce an output signal in said output circuit thereof having the frequency of the signal produced by the signal generator and having an amplitude proportional to the output signal of said electrical integrator;

said variable gain amplifier means being adapted to produce an output signal inversely proportional to the amplitude of the output signal of said linear modulator; and switching means connected to said reproducing means for connecting said reproducing means to said variable gain amplifier means during a portion of first and second reproduction cycles of said reproducing means after first arrival signals have been reproduced, connecting the output of said signal generator to said variable gain amplifier means on first alternate reproduction cycles to control the gain thereof, connecting the output of said linear modulator to said variable gain amplifier on said second alternate reproduction cycles to control the gain thereof, connecting the output of said variable gain amplifier means to said absolute value amplifier means only during first alternate reproduction cycles, and connecting the output of said variable gain amplifier means to the input terminal of said recording means only on second alternate reproduction cycles.

2. Apparatus for removing from a data trace of a reproducible seismogram the effects of variable seismic impulse parameters and variable detecting parameters, comprising:

reproducing means having output terminal means, for reproducing said data trace as an electrical output signal of said output terminal means;

recording means having input terminal means for recording electrical signals applied to said input terminal means in data trace form;

signal channel means individually connecting said output terminal means to said input terminal means including variable gain amplifier means connected between said input terminal means and said output terminal means;

an absolute value amplifier having an input terminal, for linearly amplifying an electrical signal applied thereto;

an electrical integrator connected to said absolute value amplifier for integrating the output signal of said absolute amplifier;

a constant frequency signal generator;

a linear modulator having an output circuit, connected to said signal generator and to said electrical integrator to produce an output signal in said output circuit thereof having the frequency of the signal produced by the signal generator and having an amplitude proportional to the output signal of said electrical integrator;

said variable gain amplifier means being adapted to produce an output signal inversely proportional to the amplitude of the output signal of said linear modulator;

first switching means connected to said reproducing means for connecting said reproducing means to said variable gain amplifier means only after reproduction of first arrival signals on the data traces reproduced thereby on first alternate reproducing cycles of said reproducing means; and second switching means connected to said reproducing means for connecting the output of said signal generator to said variable gain amplifier means on first alternate reproduction cycles to control the gain thereof, connecting the output of said linear modulator to said variable again amplifier on said second alternate reproduction cycles to control the gain thereof, connecting the output of said variable gain amplifier means to said absolute value amplifier means only during first alternate reproduction cycles, and connecting the output of said variable gain amplifier means to the input terminal of said recording means only on second alternate reproduction cycles.

No references cited.

BENJAMIN A. BORCHELT, *Primary Examiner.*

R. M. SKOLNIK, *Assistant Examiner.*